Nov. 1, 1949     E. A. NELSON     2,486,969
LAWN MOWER
Filed Nov. 7, 1946
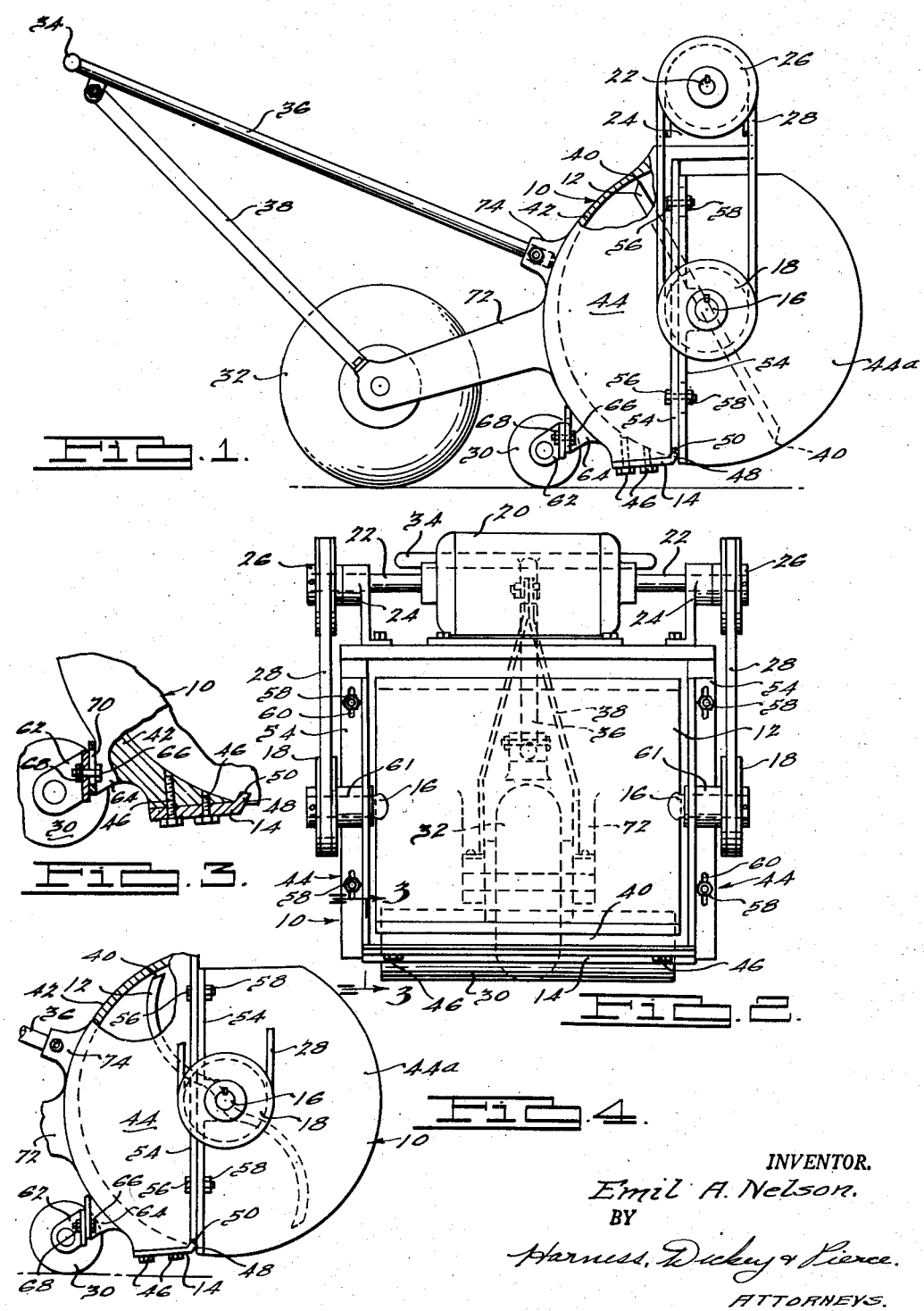
INVENTOR.
Emil A. Nelson.
BY
Harness, Dickey & Pierce.
ATTORNEYS.

Patented Nov. 1, 1949

2,486,969

UNITED STATES PATENT OFFICE 2,486,969

LAWN MOWER

Emil A. Nelson, St. Clair Shores, Mich.

Application November 7, 1946, Serial No. 708,271

10 Claims. (Cl. 56—26)

1

This invention relates to lawn mowers.

An important object of the invention is to provide a lawn mower that is designed primarily for high-speed operation.

Another object of the invention is to provide a lawn mower having a cutting mechanism which includes a cutter bar and reel and wherein the reel is power driven and preferably at relatively high speeds, as for instance, in the neighborhood of 6000 R. P. M.

Still another object of the invention is to provide a lawn mower having a housing for the cutter members, which housing is uniquely shaped to enhance the rigidity thereof and the cutting action of the high-speed reel.

Yet another object of the invention is to provide a lawn mower that produces exceedingly fine clippings which form an excellent mulch for the grass.

A further object of the invention is to provide a lawn mower which discharges the grass clippings forwardly so that those clippings which lodge above the level of the cutter bar are picked up and recut.

Other objects and advantages of the invention will be apparent during the course of the following description.

In the drawing forming a part of this specification and wherein like numerals are employed to designate like parts throughout the same, Fig. 1 is a side elevational view of a lawn mower embodying the invention, parts thereof being broken away and shown in section for clearness of illustration, Fig. 2 is a front elevational view of the same, Fig. 3 is an enlarged, fragmentary, vertical sectional view taken on the line 3—3 of Fig. 2, and Fig. 4 is a fragmentary, side elevational view showing a modified form of the invention.

Considered in certain of its broader aspects, the lawn mower embodying the present invention comprises a frame or housing indicated generally at 10 which supports a reel 12 and cutter bar 14. The reel 12 rotates on stub shafts 16 which extend longitudinally from its ends and each stub shaft carries a driven pulley 18. Surmounting the housing 10 is a driving motor 20 having oppositely extending drive shafts 22 which are arranged parallel to the driven shafts 16 and are journaled in stationary bearings 24. Driving pulleys 26 on shafts 22 are connected to driven pulleys 18 by endless belts 28. The driving motor may be of any suitable or conventional type, as for instance, of the internal combustion type or of the electric type, the latter being shown by

2 way of illustration. It is to be understood that it may be suitably or conventionally connected to the supporting wheel or wheels for the purpose of driving the mower, as well as the reel thereof, but such drive is here omitted for the purpose of simplicity in the drawing and specification.

In the particular construction shown by way of illustration the housing 10 is supported and mobilized by a roller 30 and a wheel 32 both of which are located behind the cutter bar 14, as shown in Fig. 1. Also, it will be observed that the roller 30 and wheel 32 are arranged in tandem and that the wheel is disposed behind the roller and centrally of the housing 10 (Fig. 2). In the illustrative embodiment of the invention shown, the mower is propelled and maneuvered manually by a handle 34 which is fastened to the housing 10 by a shank 36 and a pair of divergent angularly related struts 38.

With the above general description as an introduction, attention is now directed to specific details of construction and operation which define the essence of the invention.

The reel 12 here shown by way of illustration comprises an essentially rectangular solid plate having diametrically opposed cutting edges 40. However, the reel may assume any desired or conventional shape and may be either flat as shown in Fig. 1 or curved as shown in Fig. 4. The motor 20 preferably drives the reel 12 relatively rapidly and by this term is meant at a speed in the order of 6000 R. P. M. It will be understood that the reel coacts with the cutter bar 14 in the conventional manner to cut the grass. As suggested, it is necessary to drive the reel 12 at a relatively high speed in order to cut the grass into finely divided clippings which form a proper mulch for the yard. Manifestly, both of the cutting edges 40 cross the cutter bar 14 during each revolution of the reel 12. Consequently, if the reel is driven at the speed hereinabove suggested the grass is subjected to 12,000 cutting operations each minute; and, since it is intended that the mower be propelled at normal speeds, it will be readily apparent that the clippings are exceedingly fine.

Experience has shown that the efficacy of the mower for high-speed operation is affected considerably by the shape of the housing 10 and the instant construction has been found to provide maximum efficiency of operation. In accordance with the present invention, the housing 10 is an integral, one-piece structure formed with an imperforate transversely curved rear wall 42 and imperforate side or end walls 44. Rear wall 42 conforms to and is spaced slightly circumferentially from the rotating edges of the reel 12 and the side walls 44 entirely cover the ends of the reel. This shape and construction of the housing 10 makes a housing which is extremely rigid and unyielding and which forms the backbone of the whole mower structure. In conventional lawn mower constructions, the reel is mounted between and to separate end frames which are fastened together by suitable tie rods. This construction permits some flexing of the mower and, consequently fails to maintain proper clearance between the reel and cutter bar. Inasmuch as maintenance of proper clearance between the reel 12 and the cutter bar depends primarily on the rigidity of the housing 10, the importance of its rigidity is apparent. The entire front of the housing and at least the portion of the bottom ahead of the cutter bar 14 is open.

By reason of the above construction, reel 12 carries the grass clippings upwardly along the rear wall 42 and discharges them forwardly from the top of the housing 10. Thus, as the mower advances, it not only cuts the grass but also picks up any clippings which lodge above the level of cutter bar 14 and passes them again through the mower. By repeatedly cutting the clippings in this manner a large proportion of them are reduced to an even finer state than is achieved by the first cutting. When the clippings are finely divided in this manner, they pass readily through the standing grass and settle on the ground where they are not readily visible. As there clippings accumulate they form a protective covering which retains moisture in the ground and guards the grass roots against the sun, and when rotted provides ample fertilizer for the lawn. Also, by reason of the fact that side walls 44 are imperforate and are, in effect, forwardly extended by the imperforate mounting plates 44a hereinafter described so as to blanket the ends of the reel in all rotatable positions of the latter, centrifugal force generated by the rotating reel 12 does not create an indraft through the sides of the housing which disturbs the clipping previously deposited or causes a blower action on the grass about to be cut.

While any suitable and conventional shape or type of cutter bar may be used, and the one here shown is given merely by way of example, the manner of mounting the same on the housing 10 is an important feature of the invention. The cutter bar 14 extends entirely across the bottom of the housing 10 and seats solidly and is supported for its full length against the lower edge of wall 42. Cap screws 46 hold the cutter bar 14 securely fastened to the housing. In this manner, because of the above-described rigidity of the housing 10, the cutter bar is rendered equally rigid and unyielding and thereby aids in maintaining the proper clearance between it and the reel. At its forward edge cutter bar 14 is formed with an angularly inwardly extending portion 48 which defines a cutting edge 50 within the housing.

In order to mount the reel 12 and to provide for adjustment between the reel 12 and cutter bar 14, mounting plates 44a are fastened to the side walls 44. As clearly shown in the drawing, each of the mounting plates 44a is disposed in front and in the same plane as a respective wall 44, so as to constitute a forward extension of the same, and the meeting edges thereof are provided with outwardly extending flanges 54. These flanges 54 are fastened securely together by bolts 56 and nuts 58 and the front flanges have vertically elongated slots 60 which permit limited vertical adjustment of the mounting plates 44a. Also, it will be observed that the stub shafts 16 are journaled in bearings 61 which are integral with the mounting plates 44a and that the cutter bar 14 is disposed within the confines of the stationary walls 44b so that adjustment of the mounting plates moves the reel relative to the cutter bar. While not shown, suitable means are, of course, provided for fine adjustment of the sections 44a vertically to adjust the clearance between the reel 12 and cutter bar 14. Any suitable or conventional means may be provided for maintaining the endless belts 28 taut in the various adjusted positions of front wall sections 44a.

In order to adjust the cutter bar 14 vertically and thus regulate the length of cut, the roller 30 is equipped with brackets 62 which are fastened to flanged abutments 64 on the housing 10 by bolts 66 and nuts 68. As best shown in Fig. 3, bolts 66 extend through vertically elongated slots 70 in the abutments 64 so that the housing 10 can be adjusted vertically within limits defined by the slots. Manifestly, any adjustment of the housing changes the vertical distance between cutter bar 14 and the ground and varies the length of cut of the mower. The roller 30 preferably is narrower than the reel 12 and cutter bar 14 so that it travels in the swath cut by the mower and does not press down uncut grass.

The single wheel 32 which co-operates with roller 30 to support the mower is journalled between a pair of laterally spaced supporting arms 72 which are preferably formed integrally on the housing above the abutments 64 and extend rearwardly and downwardly therefrom. Also, it will be observed that the shank 36 is bolted or otherwise fastened to a clevis 74 which is located centrally on the housing 10 immediately above supporting arms 72, and that struts 38 straddle the wheel 32 and are fastened solidly on the ends of supporting arms 72. Thus, wheel 32 is disposed medianly of the housing 10 and also travels in the swath cut by the mower. Preferably, the wheel 32 is considerably larger in diameter than roller 30 so that vertical adjustment of the housing 10 has very little tilting effect on the cutter bar 14.

It is to be understood that the form of the invention herewith shown and described is to be taken as a diagrammatic illustration of the same and that various changes in the size, shape and arrangement of parts may be resorted to without departing from the spirit of the invention or the scope of the appended claims.

Having thus described the invention, I claim:

1. In a lawn mower, a rigid housing having integral back and side walls, and mounting plates on said side walls and cutting mechanism including a driven reel carried by and mounted for rotation between said mounting plates, and a cutter bar coactive with said reel, said cutter bar carried by the housing and supported for substantially the full length thereof by the back of the housing.

2. A lawn mower comprising a housing having imperforate back and side walls of rigid, one-piece construction, and mounting plates on said side walls; a driven reel carried by and mounted for rotation between said mounting plates; means for rotatably driving said reel; and a stationary cutter bar carried by said housing and supported for substantially the full length thereof by said back, said cutter bar arranged below said reel to co-operate therewith.

3. The combination as set forth in claim 2 wherein said mounting plates are vertically adjustable.

4. The combination as set forth in claim 2 wherein said cutter bar is fastened to said housing.

5. The combination as set forth in claim 2 wherein said cutter bar seats solidly for its full length against the lower edge of the back wall of the housing.

6. A lawn mower comprising a rigid, one-piece housing having imperforate back and side walls; vertically adjustable mounting plates on and in front of said side walls; coactive rotary and stationary cutter elements, the formed carried by said mounting plates and the latter seating solidly against and supported by the bottom of the housing; and a high-speed drive means for actuating the rotatable cutter member.

7. The combination as set forth in claim 6 wherein the rear wall of the housing is arcuately curved transversely thereof and spaced slightly circumferentially from the rotary cutter elements.

8. A lawn mower comprising a rigid, one-piece housing having imperforate back and side walls, said back wall being transversely curved and having its lower edge fashioned to provide a flat cutter-bar seat; and cutting mechanism carried by the housing, said mechanism including a cutter bar seating and supported for its full length against and fastened to said cutter bar seat.

9. In a lawn mower, a housing; coactive rotary and stationary cutter members in said housing, the latter having imperforate back and side wall portions and the entire front portion thereof ahead of said cutter members being open; means for driving said rotary cutter member; said housing being unsupported ahead of said cutter members and mounted on a ground-engaging roller located behind the opening and supporting said housing; support means extending rearwardly from the housing above said roller; a ground-engaging wheel carried by the support means and disposed behind said roller; and handle means including a shank portion fastened to the housing in proximity to said support means and annularly related strut portions fastened to the support means at opposite sides of said wheel.

10. A lawn mower comprising a grass cutting reel having a plurality of cutter blades and longitudinally extending shaft elements; a housing for said reel, the latter having a curved rear wall conforming generally to but spaced circumferentially from the arc described by said cutter blades during rotation of the reel, side walls rigid on and integral with said rear wall, and spaced from the ends of the reel and a front opening extending substantially the full width of the reel and from a point substantially directly below the axis of the latter to the top of said housing; mounting plates on said side walls; bearings on said mounting plates rotatably supporting said reel shaft elements; a cutter bar solidly supported by the rear wall of the housing and coactive with said reel to cut the grass; and means for rotatably driving said reel.

EMIL A. NELSON.

REFERENCES CITED

The following references are of record in the file of this patent:

UNITED STATES PATENTS

| Number | Name | Date |
| --- | --- | --- |
| 2,097,761 | Gallinant | Nov. 2, 1937 |
| 2,152,252 | Godwin et al. | Mar. 28, 1939 |
| 2,238,707 | Ronning | Apr. 15, 1941 |
| 2,388,165 | Loewe et al. | Oct. 30, 1945 |